United States Patent [19]

Andrews et al.

[11] Patent Number: 5,378,098

[45] Date of Patent: * Jan. 3, 1995

[54] HOLE FILLING BLIND RIVET

[75] Inventors: George A. Andrews, Anaheim Hills; John D. Pratt, Laguna Niguel; Soheil Eshraghi, Irvine, all of Calif.

[73] Assignee: Textron Inc., Providence, R.I.

[ * ] Notice: The portion of the term of this patent subsequent to Oct. 12, 2010 has been disclaimed.

[21] Appl. No.: 132,502

[22] Filed: Oct. 5, 1993

Related U.S. Application Data

[63] Continuation-in-part of Ser. No. 987,659, Dec. 9, 1992, Pat. No. 5,252,014.

[51] Int. Cl.6 .................. F16B 13/04; F16B 13/06
[52] U.S. Cl. ...................... 411/43; 411/70; 29/525.2
[58] Field of Search ............... 411/43, 69, 70; 29/524.1, 525.2; 403/408.1

[56] References Cited

U.S. PATENT DOCUMENTS

| | | |
|---|---|---|
| 2,061,629 | 11/1936 | Huck . |
| 2,114,493 | 4/1938 | Huck . |
| 2,466,811 | 4/1949 | Huck . |
| 3,288,016 | 11/1966 | Reynolds . |
| 3,377,907 | 4/1968 | Hurd . |
| 4,230,017 | 10/1980 | Angelosanto . |
| 4,451,189 | 5/1984 | Pratt . |
| 4,627,775 | 12/1986 | Dixon . |
| 4,897,004 | 1/1990 | Norton . |
| 4,936,725 | 6/1990 | Eshraghi . |
| 5,006,024 | 4/1991 | Siebol .................. 411/70 X |
| 5,052,870 | 10/1991 | Pratt et al. . |
| 5,054,977 | 10/1991 | Schultz ................ 411/69 X |
| 5,056,973 | 10/1991 | Pratt et al. . |
| 5,131,107 | 7/1992 | Pratt et al. . |
| 5,252,014 | 10/1993 | Andrews . |

Primary Examiner—Neill R. Wilson
Attorney, Agent, or Firm—Knobbe, Martens, Olson & Bear

[57] ABSTRACT

A blind fastener designed to secure workpieces having aligned holes therein is provided. The fastener comprises an elongated stem having a head at one end and a serrated tail at the other, and a tubular sleeve having a head through which tail of the stem extends and a tail which is engaged by the head of the stem. The stem further includes a shear ring for bulbing the sleeve tail and a lock ring groove for receiving a lock ring for locking the stem to the sleeve. The stem also has a shoulder which engages shoulder portion in the sleeve to cause the sleeve to expand radially outward so as to fill any clearance or gap between the sleeve and the workpieces. A reservoir located in the stem accepts excess shoulder material displaced during the hole filling process. In one embodiment, a preformed lock ring is positioned in the lock ring groove to lock the stem to the sleeve. In another embodiment, a lock ring is formed from material in the sleeve head.

10 Claims, 9 Drawing Sheets

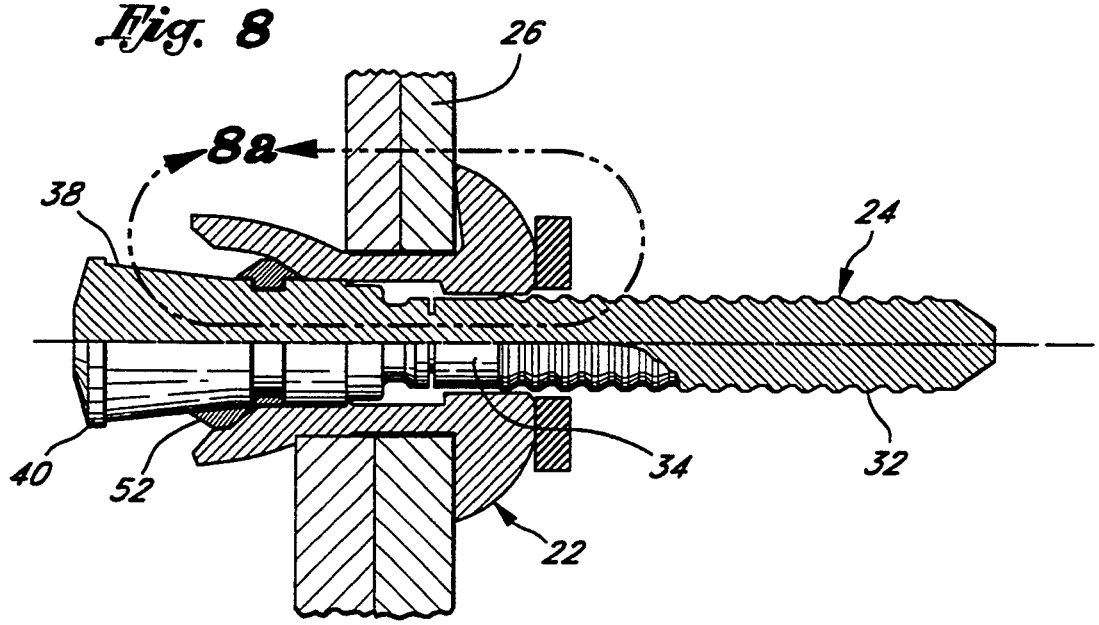
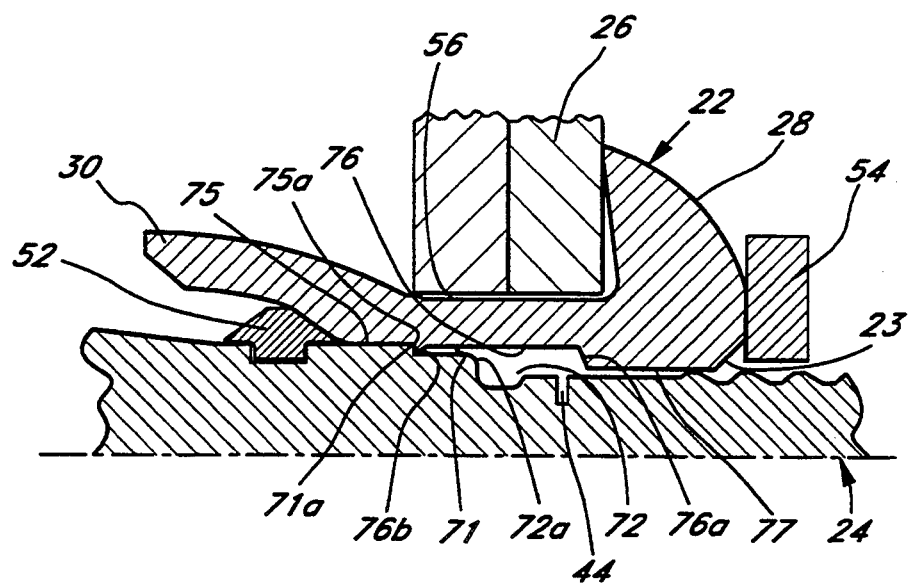

HOLE FILLING BLIND RIVET

RELATED APPLICATION

This is a continuation-in-part of U.S. patent application Ser. No. 07/987,659, filed Dec. 9, 1992, issuing on Oct. 12, 1993, as U.S. Pat. No. 5,252,014.

FIELD OF THE INVENTION

The present invention relates to blind fasteners including a stem and sleeve for securing workpieces together, a stem lock ring, and a means for filling varying sized workpiece openings.

BACKGROUND OF THE INVENTION

Blind fasteners are utilized in fastening workpieces in which only one side of the workpiece is accessible. One such fastener, described in U.S. Pat. No. 5,131,107, issued to Pratt, et al, includes a stem and fastener body or sleeve which are inserted as a unit into aligned openings in workpieces. The stem is an elongated body having one end or tail designed for gripping by a pulling tool. The opposite end of the stem has an enlarged head. A shear ring is mounted on the end of the stem near the head, and a lock ring is located near the middle of the stem.

The sleeve has a preformed head which engages the accessible side of the workpieces, and a tail which is designed for engagement of the blind side of the workpieces. The stem is inserted in the tubular body with the shear ring engaging the body tail and the stem tail protruding beyond the fastener body head.

To install this blind fastener, the stem and fastener body are inserted into the workpiece opening until the head of the fastener body engages the workpiece. The pulling tool is used to grasp the stem tail, and a force is applied to pull the stem through the sleeve with the tool nose reacting against the fastener body head. As the stem is pulled, the bulbing portion of the shear ring slides within the tail of the fastener body, causing the tail to bulb radially outwardly. The shear ring is constructed such that after the bulbing is completed and a predetermined compressive force is applied to the workpieces through the shear ring and the bulbed tail, the shear ring separates from an anchor portion of the ring.

Continued pulling causes the stem to slide through the sheared ring and move further within the fastener body. This enables the fastener to be used with workpieces having a variety of thicknesses. As the stem moves within the fastener body, a neck on the stem encounters a slightly reduced diameter portion of the fastener body interior, causing radial expansion of the fastener body, aiding in at least the partial filling of gap or clearance between the fastener body and the workpieces.

As the stem reaches its installed position, the lock ring encounters an anvil on the pulling tool, causing the lock ring to be compressed into a small recess at the end of the bore in the fastener body. When the lock ring has fully deformed, continued pulling increases the load causing the tail of the stem to break away at a break groove located beyond the lock ring at that point.

The fastening procedure is then complete. The radial pressure from the stem against the reduced diameter portion of the fastener body creates a tight fit between the stem and the fastener body, and has improved the fit between the fastener and the workpieces. The workpieces are held securely together by the tension in the fastener body. The stem is captured within the fastener body by the shear ring and the stem head at one end, and the deformed lock ring at the other.

While the fastener described in U.S. Pat. No. 5,131,107 has some workpiece hole filling capability because the interference between the stem and the sleeve radially expands the sleeve, greater hole filling capability is desirable, because of variations in workpiece hole size. Also, tolerance must be maintained fairly closely in that too much interference between the stem and sleeve could cause excessive friction of the stem in the sleeve and cause the stem to sever before it has reached its fully installed position. While the manufacturer of the fastener can maintain close tolerances in the stem diameter and inner and outer sleeve diameter, the manufacturer cannot oversee the creation of the hole into which the fastener is to be installed.

U.S. Pat. No. 4,627,775 issued to Dixon discloses a fastener which provides hole fill capability with formation of a lock ring. That patent describes a blind fastener having a pin and sleeve arrangement, but does not employ a preformed lock ring. Instead, major interference is created between the pin and the sleeve causing expansion of the sleeve to fill the gap between the sleeve and the workpieces. This interference also results in sleeve material being extruded into a lock groove to form a lock between the pin and sleeve.

An annular extruding land, or enlarged section, is formed on the pin adjacent the lock groove and on the side of the stem towards the fastener head. When the stem is pulled through the sleeve, the extruding land interferes with the inner wall of the sleeve. This causes the sleeve to expand outwardly and fill any space between the outside of the sleeve and the workpieces. At the same time, the land extrudes material from the wall of the sleeve. This material is pushed ahead of the land into the lock groove. When the pin is fully installed, a stop land encounters the surface of an installation tool anvil, and further pulling causes the serrated end of the pin to separate at a break notch. At this time, the material extruded from the sleeve sufficiently fills the lock groove so as to prevent removal of the pin from the sleeve.

One drawback of the device described in the Dixon patent is that the action necessary to create the locking ring is made difficult when the sleeve is made of a very tough metal or alloy. If the sleeve is made of a particularly durable alloy or metal, the pulling force necessary to extrude the sleeve material may be so high that the pin severs at the break groove before installation. Related to that, considerable interference is needed to provide enough material for workpiece hole fill and to provide the stem locking function.

Another, shortcoming of the Dixon design is that in practice, the extruded sleeve material does not always extend across the locking groove in the stem, with the result that the pin is not completely locked axially, but can move axially a bit with respect to the sleeve after the fastener is installed.

U.S. Pat. No. 3,288,016 issued to Reynolds discloses a fastener in which a lock ring is formed as a portion of the sleeve head instead of a pre-formed separate piece. However, the Reynolds design does not provide a reservoir for retaining excess extruded material. A two part locking groove is always filled at the same time as some incidental hole fill occurs. The locking groove does not function as a reservoir. As a result, too much interference between the stem and sleeve could cause premature "locking" of the stem in the sleeve and cause the stem to sever before it has reached its fully installed position.

U.S. Pat. No. 2,466,811 issued to Huck discloses a fastener where a preformed lock ring is a breakaway portion of the outer axial end of the sleeve head instead of an internally formed ring. The Huck design provides a reservoir of sorts, by utilizing a sleeve counterbore adjacent the sleeve head. In Huck, a stem shoulder 25 may carry a small amount of metal with it into the counterbore 21 to be ironed out against the wall of the counterbore and to prevent its movement into an adjacent locking recess in the sleeve head for the lock ring. However, it is difficult for the stem shoulder to move sleeve metal from the area of initial interference to the sleeve counterbore 21 because sleeve material between the shoulder and the counterbore is in the way.

Thus a need exists for a fastener that overcomes the above-described limitations and problems of prior art fasteners.

SUMMARY OF THE INVENTION

FIGS. 1–6 of this application disclose a fastener which is disclosed and claimed in the parent application Ser. No. 987,659. This fastener includes a sleeve, and an elongated stem having at one end a serrated tail, and at the other end an enlarged head. The stem and the sleeve form a reservoir adjacent the shoulder for receiving excess sleeve material extruded during installation. The stem further has a locking groove adjacent the reservoir to receive a lock ring.

The sleeve interior bore diameter near the sleeve tail is sized to receive the stem readily, but narrows at a shoulder located midway along the bore to interfere with a shoulder on the stem.

In accordance with the method of the invention, the fastener, with the stem in the sleeve, is inserted into aligned openings in workpieces. A pulling tool is used to pull the stem in a direction which is out of the workpieces, with the tool engaging an anvil on the sleeve head. As this occurs, the shear ring encounters the tail of the sleeve, the ring sliding into the tail and causing it to bulb outwardly. Further pulling causes the shear ring to shear when the bulbed tail engages the workpiece, a portion of the ring remaining with the stem, and the bulbing portion of the ring sliding on the outside of the stem, maintaining pressure on the tail.

As the stem is pulled within the sleeve, the shoulder of the stem encounters the shoulder in the sleeve. In a situation in which there is a gap or clearance between the sleeve and the workpieces, the sleeve will be enlarged radially outward to fill the workpiece hole. In the case in which the hole is small or the sleeve is large so that little or no clearance exists, the shoulder material will be sheared or extruded from the sleeve and be deposited into the reservoir in the stem which is adjacent the stem shoulder.

As the stem approaches its fully set position, the lock ring will encounter the anvil located flush with the head of the sleeve. As continued pulling occurs, the lock ring is deformed, filling the recess in the sleeve head. As increased force is applied, the stem severs at a break notch in the stem. The fastener thus secures the workpieces together, any gap originally present between the sleeve and workpieces is eliminated, and the stem is locked to the sleeve.

While the locking ring used to lock the stem to the sleeve near the head of the sleeve is very effective, the reservoir of this fastener may provide supplemental locking. In a preferred arrangement, the reservoir adjoins the stem lock ring groove. Since in the extreme tolerance and clearance condition all extruded sleeve material is used for hole fill, the lock ring volume is selected so that satisfactory stem locking is obtained with only the lock ring.

There are some advantages to not having a separate lock ring but yet having reliable axial locking of the stem to the sleeve and having consistent hole fill. Thus, in another embodiment of the invention, a blind fastener stem is provided a shoulder which will enlarge a sleeve to fill a workpiece hole while removing excess material from the interior of the sleeve. For this purpose, the stem includes an annular reservoir open to the stem shoulder to receive the excess sleeve material not used to fill the clearance between the sleeve and the workpiece when the fastener is set. The volume of the reservoir is less than the volume of an adjacent lock ring groove in the stem, but sufficient to accommodate all of the excess material in the maximum interference condition between the stem shoulder and the sleeve, and the sleeve and the workpiece.

The reservoir groove is positioned between the stem shoulder and the stem lock groove.

The stem includes a reduced diameter portion which slides within a reduced diameter portion of the sleeve head. The boundary between the reservoir groove and the lock ring groove creates a lock ring forming shoulder on the stem. As the stem is drawn into the sleeve, the lock ring forming shoulder engages the reduced diameter portion of the sleeve head, and material is extruded from that sleeve portion into the lock ring groove.

These and other features and advantages of the present invention will become apparent from the detailed description of the preferred embodiments which follows, when considered with the attached drawings and claims.

BRIEF DESCRIPTION OF THE DRAWINGS

FIG. 1a is an enlarged cross-sectional view of the fastener of FIG. 1, in the area marked 1a.

FIG. 2a is an enlarged cross-sectional view of the fastener of FIG. 2, in the area marked 2a.

FIG. 3a is an enlarged cross-sectional view of the fastener of FIG. 3, in the area marked 3a.

FIG. 4a is an enlarged cross-sectional view of the fastener of FIG. 4, in the area marked 4a.

FIG. 7a is an enlarged cross-sectional view of the fastener of FIG. 7, in the area marked 7a.

FIG. 8 is a cross-sectional side view of the fastener of FIG. 7 when the stem is partially installed and the shear pin has begun to bulb the tail of the sleeve outwardly.

FIG. 8a is an enlarged cross-sectional view of the fastener of FIG. 8, in the area marked 8a.

FIG. 9a is an enlarged cross-sectional view of the fastener of FIG. 9, in the area marked 9a.

FIG. 10a is an enlarged cross-sectional view of the fastener of FIG. 10, in the area marked 10a.

DETAILED DESCRIPTION OF FIGS. 1-6

Figure 1:
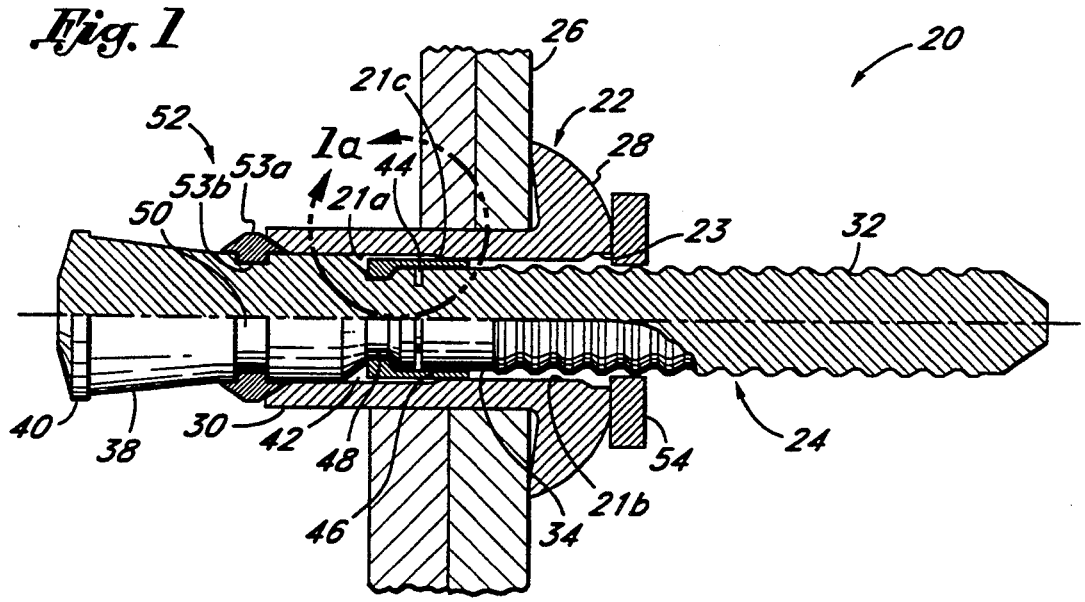
FIG. 1 is a cross-sectional side view of a blind fastener in a workpiece, and yet to be installed; the top half of the drawing illustrating the fastener as used with thinner workpieces, and the lower half of the drawing illustrating the fastener as used with thicker workpieces.

Referring to FIG. 1, there is shown a blind fastener 20 comprising a tubular sleeve 22 and a stem 24 mounted through aligned workpiece openings. The workpieces 26 may be of a thickness varying from a predetermined minimum as shown in the upper half of the figure, to a predetermined maximum thickness as shown in the lower half of the figure. The fastener 20 has grip length compensation to accommodate such variations.

The sleeve 22 as shown has a head 28 at one end in contact with the accessible side of the workpieces 26. A tail 30 of the sleeve 22, located opposite the head 28, has an outwardly tapered or beveled inner diameter. As seen, the sleeve 22 protrudes beyond the blind side of the workpieces 26.

The sleeve 22 has a bore having a larger diameter portion 21a which extends from the tail 30 towards the head 28. The bore also has a reduced diameter portion 21b creating a shoulder 21c spaced from the top of the manufactured head 28 a distance about equal to the outer diameter of the sleeve 22. The exact location of the shoulder 21c is selected such that when the fastener 20 is used with thicker workpieces 26, any gap between the sleeve portion 21a and workpieces 26, will be closed by the bulbing action of the tail 30. Any gap in the area of the reduced diameter portion 21b will be closed by the radial expansion of the sleeve 22, as caused by interference between the shoulder 21c and the stem 24, as will be described in more detail later. The reduced diameter portion 21b extends from the shoulder 21c to a larger diameter annular recess 23 located at the other end of the head 28.

The stem 24 has a generally cylindrical shape and extends through and beyond the sleeve 22. The stem 24 has a tail 32 on one end which is serrated to allow gripping by a pulling tool (not shown). The tool will not be described here as various types are well known.

Extending away from the tail 32 of the stem 24 is a smooth midsection 34. At the end of the stem 24 opposite the tail 32 is an elongated neck 38 and a head 40.

The forward non-tapered part of the neck 38 has an outer diameter which is sized to fit into the sleeve portion 21a with little, if any, clearance. The neck 38, as illustrated in FIG. 1, is of almost the same length as the length of the sleeve 22 itself, with the length of the tapered portion of the neck being about equal to the outside diameter of the sleeve shank.

The neck 38 meets the midsection 34 at an annular locking groove 42, the forward face of the neck forming shoulder. The diameter of the stem 24 at the groove 42 is smaller than the diameter of the stem 24 at either the neck 38 or the midsection 34, and yet is larger than the diameter of the stem 24 at a break groove 44 which is spaced forwardly from the lock groove.

A pre-formed lock ring 46 surrounds the stem and in the arrangement shown is positioned within the lock groove 42. The lock ring 46 has a large engagement or anchor portion 46a which fits snugly within the lock groove 42. The lock ring 46 also has an annular elongated, thinner portion 46a which extends axially from the engagement portion in the direction of the stem tail 32. The radial thickness of the lock ring 46 is preferably chosen such that the diameter of the stem 24 at the midsection 34, in combination with the lock ring 46, is equal to, or slightly less than, the diameter of the sleeve 24 at the reduced diameter portion 21b. This allows the ring 46 to smoothly travel within the sleeve 22.

As seen, the lock ring 46 forward portion surrounds the break groove 44 which is located in the stem 24. The break groove 44, located within the smooth midsection 34 of the stem 24, forms a reduced diameter stem section. The inner diameter of the stem 24 at the groove 44 is the smallest of the stem 24, in order that the stem 24 will separate at a pre-determined pulling or tensile force at this location.

Figure 1A:
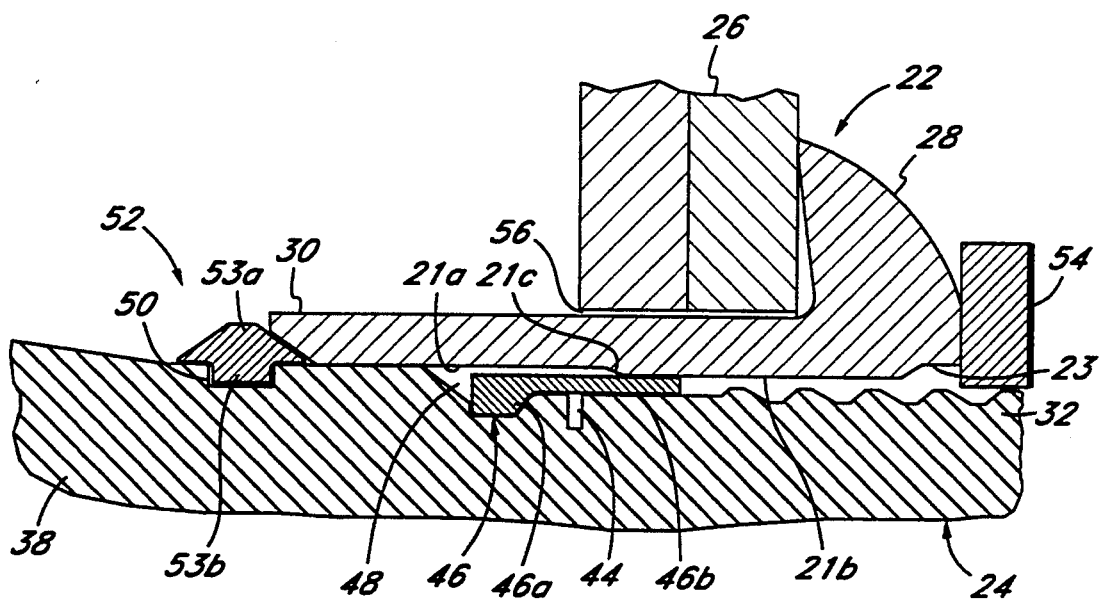

A reservoir 48 is located adjacent the locking groove 42, and in the arrangement shown, is formed out of the neck 38 portion of the stem 24. The reservoir 48, as illustrated in FIGS. 1 and 1a, is an annular notch formed by tapering the diameter of the neck 38 radially inwardly until it meets the lock groove 42 and lock ring 46. As illustrated, in order that the lock ring 46 remain in the lock groove 42, the reservoir 48 inner diameter is larger than that of the lock groove 42. The exact size of the reservoir 48 may be varied, in the embodiment illustrated in FIGS. 1-4, by varying the angle of taper from the neck 38 to the lock groove 42. The overall volume of the reservoir 48 is determined by the area bounded by the rear of the lock ring anchor portion 46a, the sleeve 22, and the tapered portion of the neck 38.

While the reservoir 48 may be formed by tapering the neck 38 as illustrated, there are various cross-sectional shapes that may be employed. Further, while it is preferable to have the reservoir 48 located adjacent the lock groove 42 and lock ring 46, as will be described in more detail later, it is not absolutely necessary for this to be so. For example, it is possible to locate the reservoir 48 spaced from the lock groove 42.

Figure 5:
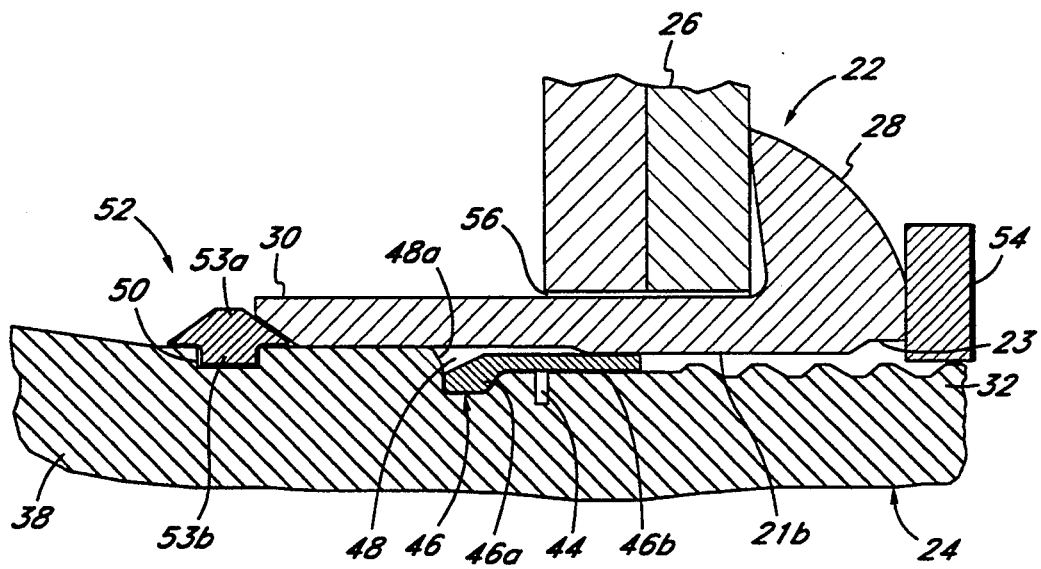
FIG. 5 is an enlarged cross-sectional view of the blind fastener of the invention yet to be installed, illustrating the reservoir when formed adjacent a modified lock ring.

As illustrated in FIG. 5, it is also believed advantageous to form the reservoir 48 from a chamfer or recess located directly in the lock ring 46 or adjacent a modified lock ring. In this form, the reservoir 48 is formed by tapering the anchor portion 46a of the lock ring from the thinner portion 46 of the lock ring 46 to where the lock ring 46 meets the forward face or shoulder of the neck 38 of the stem 24. As illustrated, a small chamfer 48a is placed in the neck shoulder in order to facilitate smooth movement of the stem 24 within the sleeve 22 including engagement with the sleeve shoulder 21c.

While it is believed advantageous to form the reservoir 48 from a chamfer in the lock ring 46, the reservoir could, of course, be a variety of shapes. In any case, however, it is desired that the engagement portion of the lock ring 46 remain sufficiently unchanged, in order that the function of the lock ring 46 not be materially affected. Related to this, the volume of lock ring material must provide the necessary locking without the need for any supplemental lock.

Figure 6:
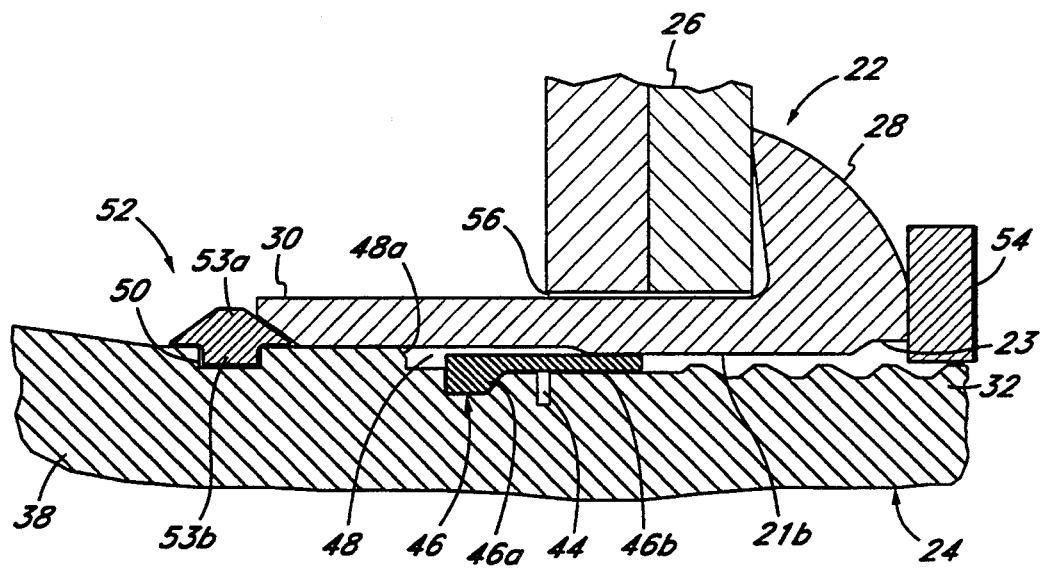
FIG. 6 is a cross-sectional view illustrating a reservoir having a shallow rectangular shape.

FIG. 6 shows a reservoir shape with a shallow rectangular cross section, and use of the chamfer 48a on the forward face of the neck.

As illustrated in FIGS. 1 and 1b, a second annular groove 50 is formed into the neck 38 between the lock groove 42 and the head 40. A shear ring 52 is located within this groove 42. The shear ring 52 comprises a bulbing or shearing portion 53a and an anchor portion 53b. The anchor portion 53b of the shear ring 52 is designed to fit snugly within the groove 50. The shearing portion 53a of the shear ring 52 extends from the anchor portion 53b and protrudes above the outer diameter of the neck 38 of the stem 24. As illustrated in FIGS. 1 and 1a, the shearing portion 53a of the shear ring 52 is trapezoidal in shape, having a wide base portion and narrow top portion, with tapered ramps on each side. The tapered ramp on the shearing portion 53a of the shear ring 52 corresponds to the taper in the end of the tail 30 of the sleeve 22, allowing the tail 30 to ride up over the shear ring 52 as it is pulled within the sleeve 22. The width of the anchor portion 53b of the shear ring 52 is chosen such that the anchor portion 53b and shearing portion 53a of the ring 52 will separate when the shear ring 52 is subjected to a predetermined shearing force.

While the above-described shear ring 52 is believed preferable, it is, of course, possible to have the shear ring 52 shaped in any number of configurations. For example, the shearing portion 53a could be rounded, tapered only on the side which engages the tail 30, or it could be somewhat triangular in shape. Likewise, other known tail bulbing techniques may be employed.

In operation, the fastener 20 is inserted into aligned holes in workpieces 26. The fastener 20 is inserted with the tail 30 of the sleeve 22 and the head 40 of the stem 24 protruding through to the blind side of the workpieces 26. The head 28 of the sleeve 22 is pressed against the accessible side of the workpieces 26, with the tail 32 of the stem 24 protruding from the sleeve 22 away from the workpieces 26.

A pulling tool (not shown) grips the serrated tail end 32 of the stem 24, and an anvil portion 54 of the tool is pressed against the head 28 of the sleeve 22, as illustrated in FIGS. 1 and 1a. As seen, the shear ring 52 is pressed against the tail 30 of the sleeve 22. The neck 38 of the stem 24 is located in the larger diameter sleeve portion 21a.

When the fastener 20 is first inserted into the workpieces 26, it is very likely that there will be a clearance or gap 56 between the sleeve 22 and the workpieces 26. Such a gap 56 is shown in FIG. 1a.

Figure 2:
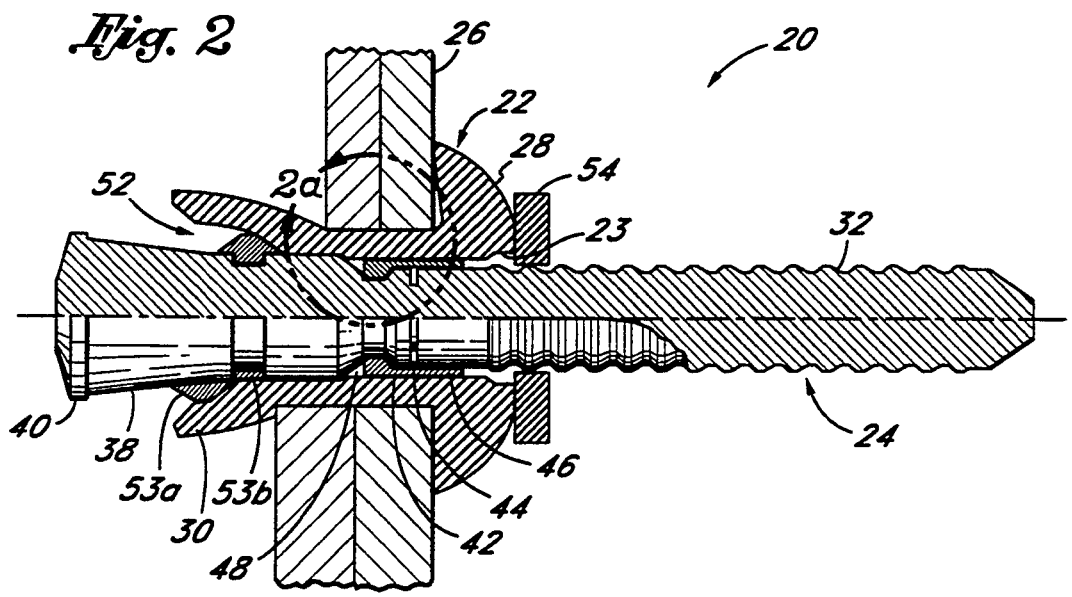
FIG. 2 is a cross-sectional side view of the fastener of FIG. 1 when the stem is partially installed and the shear pin has begun to bulb the tail of the sleeve outwardly.
Figure 2A:
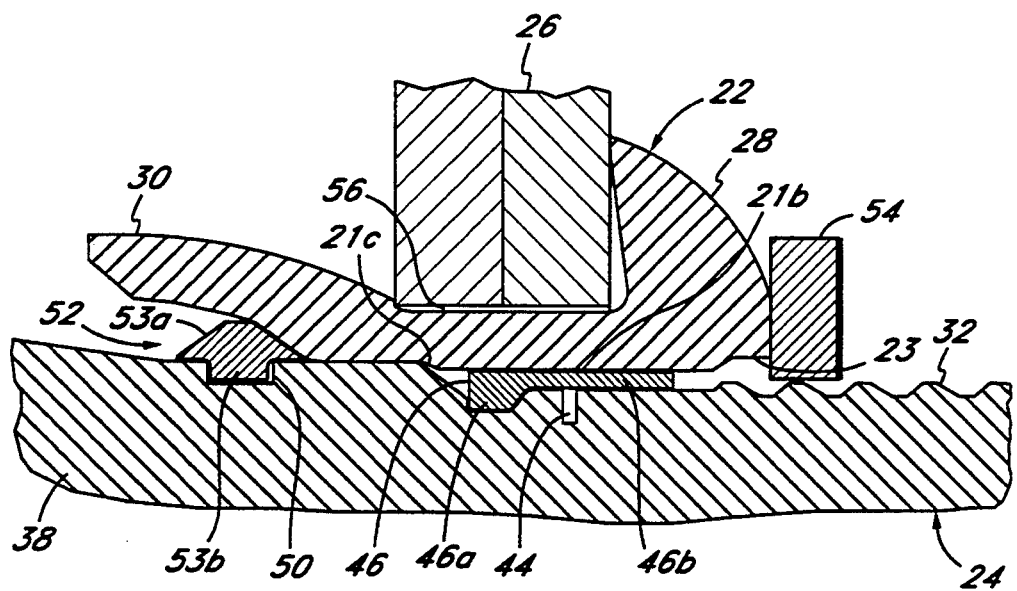

FIGS. 2 and 2a illustrate the fastener 20 after the pulling tool has begun to pull the stem 24 through the sleeve 22 and where the stem 24 is at the location where the leading portion of the neck 38 abuts the sleeve shoulder 21c.

As can be seen in FIG. 2, at this time, the tail 30 of the sleeve 22 has slid over the shear ring 52, causing the tail 30 to bulb outwardly. As shown in the top half of FIG. 2, with thin workpieces 26 the forces on the shear ring have not yet exceeded the force necessary to shear the bulbing portion 53a from the anchor portion 53b of the shear ring 52. On the other hand, as illustrated in the bottom half of FIG. 2, when used in conjunction with thicker workpieces 26, the bulbed tail 30 is in tight engagement with the workpieces 26 so that the force on the shearing ring 52 was higher and caused the bulbing portion 53a to be sheared from the anchor portion 53b of the shear ring 52.

At this stage, the gap 56 between the sleeve 22 and the workpieces 26 has been slightly closed in the area where the bulbed tail 30 has been pulled against the workpiece. In this manner, it can be seen that the bulbing action of the tail 30 serves some function in closing the gap 56; however, it is apparent that this function alone is insufficient to accomplish the task of filling the workpiece hole along substantially the entire thickness of the workpieces 26. Therefore, it is necessary that the reduced diameter portion 21b on the sleeve 22 extend a distance sufficiently along the length of the sleeve 22 such that when the fastener 20 is used with the maximum thickness workpieces 26, the hole filling function is accomplished. This function is detailed in conjunction with FIGS. 3 and 3a.

Figure 3:
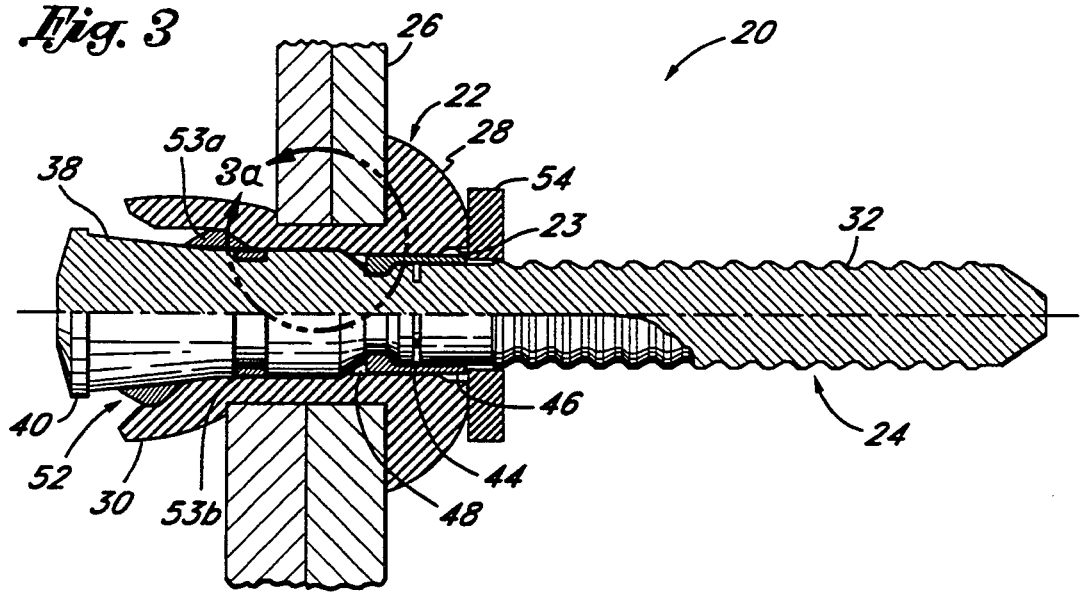
FIG. 3 is a cross-sectional side view of the fastener of FIG. 1 when the stem is partially installed and interference between the stem and sleeve has caused the sleeve to radially expand.
Figure 3A:
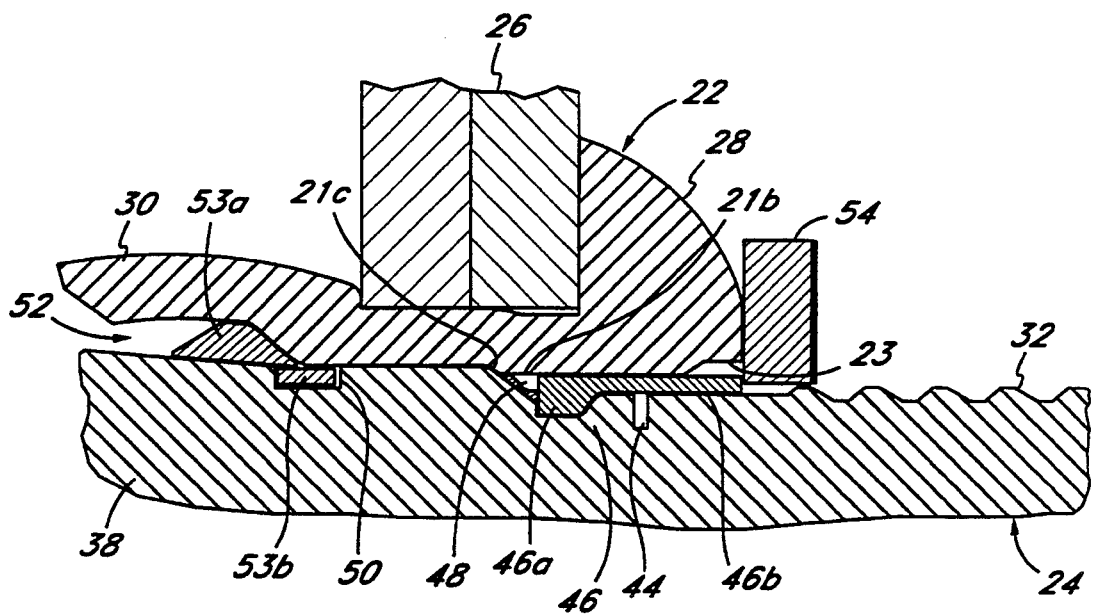

FIGS. 3 and 3a illustrate the fastener 20 when the lock ring 46 has just encountered the anvil 54. At this point, the bulbing portion 53a of the shear ring 52 has been sheared from the anchor portion 53b. Further, the neck 38 of the stem 24 has engaged the sleeve shoulder 21b within the reduced diameter portion 21b. As illustrated, when this occurs, the interference between the neck 38 and the sleeve 22 has caused: 1) the sleeve 22 to be pressed outwardly so as to fill the gap 56 between the sleeve 22 and the workpieces 26; and 2) any excess sleeve shoulder material to be deposited or extruded into the reservoir 48.

Figure 4:
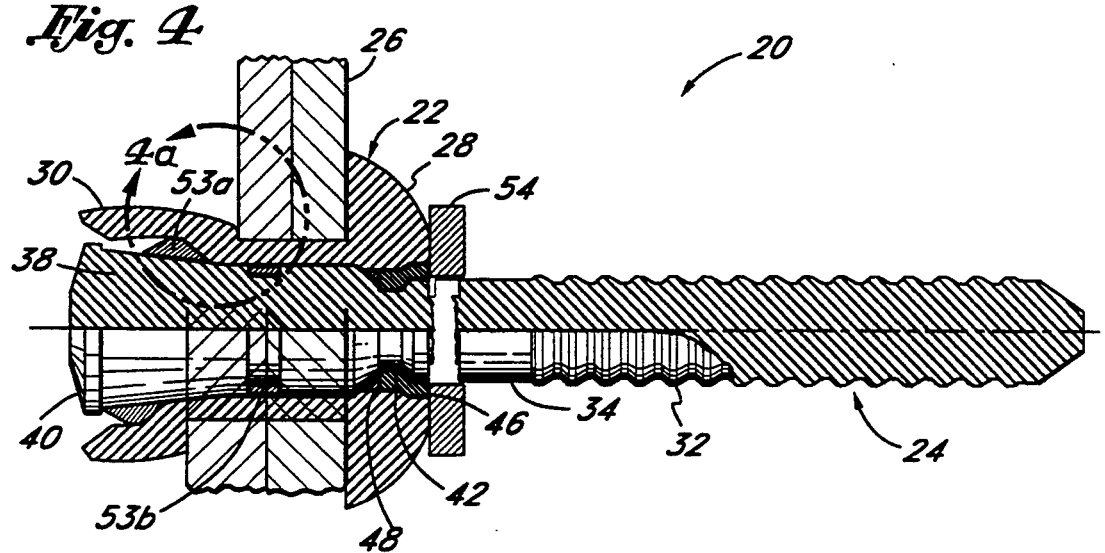
FIG. 4 is a cross-sectional side view of the fastener of FIG. 1 when fully installed.
Figure 4A:
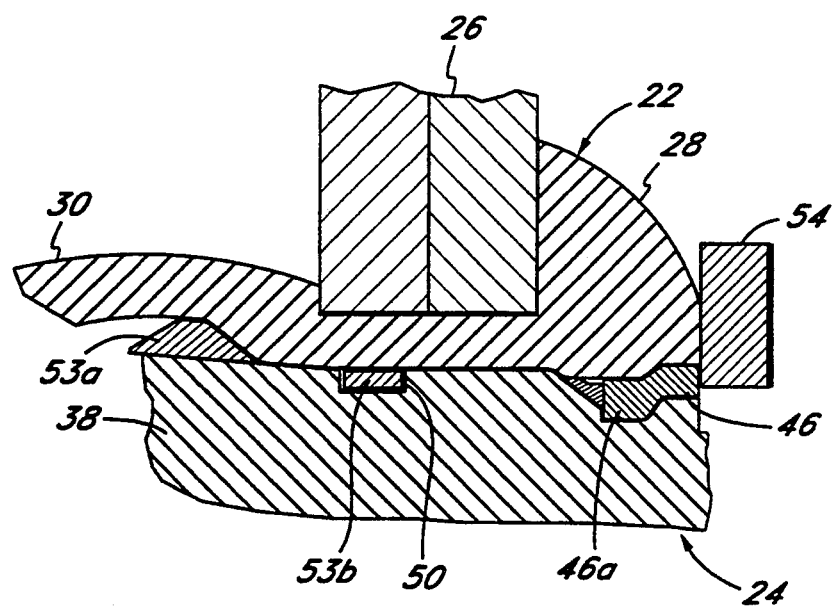

FIGS. 4 and 4a illustrate the fastener 20 when it is fully installed. The lock ring 46 has been pressed against the anvil 54 until it has deformed and filled in the recess 23 located in the head 38 of the sleeve 22. Further, the neck 38 portion of the stem 24 has moved through the reduced diameter portion 21b of the sleeve 22, entirely closing the gap 56 which had existed between the sleeve 22 and the workpieces 26. As this occurred, the neck 38 of the stem 24 continued to shear or extrude any excess material from the reduced diameter portion 21b of the sleeve 22, this material being forced into the reservoir 48. Lastly, as the pulling force on the stem 24 is increased under the resistance of the lock ring 46 deformation, the stem 24 is separated at the break notch 44 located in the midsection 34 of the stem 24.

As illustrated in FIG. 4, when the fastener 20 is fully installed, the sheared portion 53a of the shear ring 52 and the stem head prevents the stem 24 from being pulled through the sleeve 22 towards the accessible side of the workpieces 26. At the same time, the deformed lock ring 46 filling the recess 23 in the sleeve 22 prevents the stem 24 from being pulled downward or otherwise falling out from the sleeve 22 through the blind side of the workpieces 26. Also, any gap 56 between the sleeve 22 and the workpieces 26 has been filled. The entire fastener 20 is clamping the workpieces 26 together between the head 28 of the sleeve 22 on the accessible side of the workpieces 26, and by the bulbed tail 30 on the blind side.

The filling of the reservoir 48 and any gap surrounding the lock ring 46 caused by tolerance differences between the stem 24 and sleeve 22 provides a secondary or supplemental stem lock. This lock, while useful in aiding the primary lock provided by the deformation of the lock ring 46, is not mandatory, however. Therefore, in the event that no material is sheared from the reduced diameter portion 21b of the sleeve 22, primary locking still occurs and is adequate.

Most importantly, the hole filling function provided by the interference between the neck 38 of the stem 24 and the reduced diameter portion 21b of the sleeve 24 is facilitated by the presence of the reservoir 48. Examples of the variations in workpiece/sleeve hole size 56 will help illustrate the importance of the reservoir 48.

A. If the sleeve 22 is much smaller than the opening in the workpiece 26 through which the fastener 20 is inserted, the maximum sized gap 56 is created between the sleeve 22 and the workpiece 26. Therefore, the interference between the neck 38 of the stem 24 and the reduced diameter portion 21b of the sleeve 22 must be such that the gap 56 between the sleeve 22 and the workpieces 26 is still filled. This interference is created by sizing the neck 38 and reduced diameter portion 21b of the sleeve 22 accordingly. Of course the sleeve 22 and the stem 24 also have tolerances in their fabrication such that the largest clearance condition of the tolerance range should also be considered. This is a situation in which there should be little, if any, shearing of material from the reduced diameter portion 21b, as all of the shoulder material is necessarily used to fill the gap 56 or clearance.
  B. If the sleeve 22 fits snugly within the workpieces 26 before the stem 24 is fitted, there is little, if any gap 56 between the sleeve 22 and workpiece to fill. In this instance, the majority of the shoulder material must be extruded or sheared off by the neck 38, as the sleeve 22 does not have room to expand. Thus, the maximum amount of material will move into the reservoir 48. Therefore, the reservoir 48 must be sized to accommodate this situation. Again, the tolerance range between the stem 24 and the sleeve 22 should be considered, the smallest clearance in this condition.
  C. Intermediate sleeve 22 and workpiece 26 sizes exist, where an amount of material between the maximum and no material at all is moved from the reduced diameter portion 21b into the reservoir 48. These situations pose no problem once the reservoir 48, reduced diameter portion 21b, and neck 38 sizes have been chosen to accommodate the above two situations.

FIGS. 7–10

Figure 7:
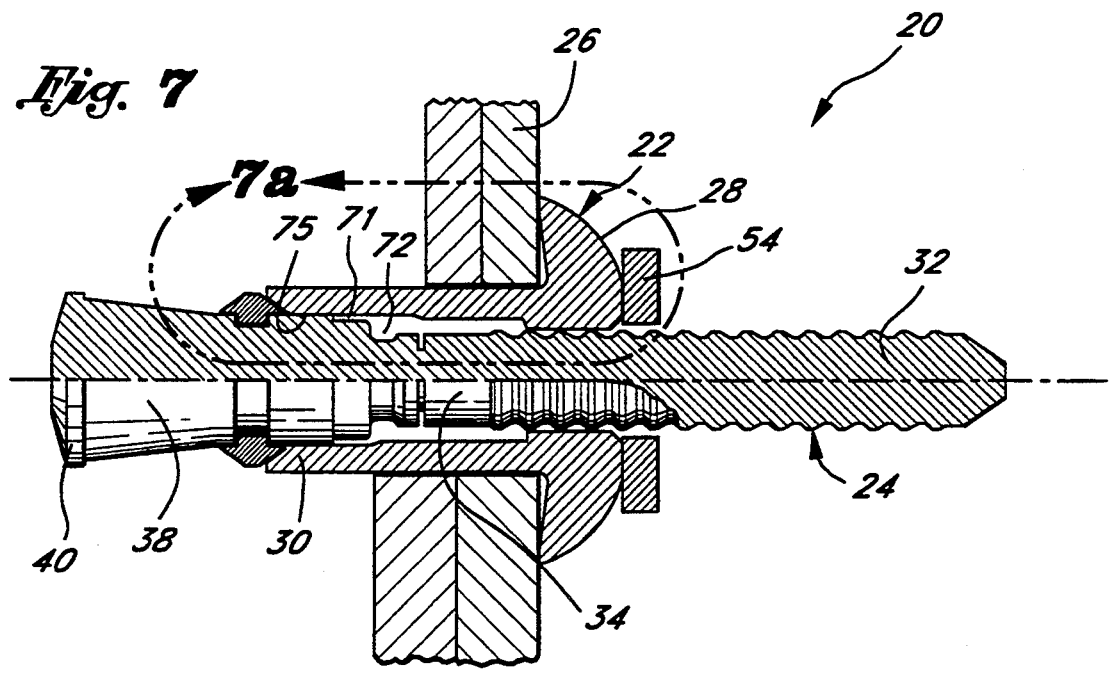
FIG. 7 is a cross-sectional side view of the blind fastener of the invention in a workpiece, and yet to be installed; the top half of the drawing illustrating the fastener as used with thinner workpieces, and the lower half of the drawing illustrating the fastener as used with thicker workpieces.

Referring to FIG. 7, there is shown another embodiment of the blind fastener 20, also comprising a tubular sleeve 22 and a stem 24 mounted through aligned workpiece openings.

The sleeve 22 as shown has a head 28 at one end in contact with the accessible side of the workpieces 26. A tail 30 of the sleeve 22, located opposite the head 28, has an outwardly tapered or beveled inner diameter. As seen, the sleeve 22 protrudes beyond the blind side of the workpieces 26.

The sleeve 22 has a bore having a larger diameter portion 75 which extends from the tail 30 towards the head 28. The bore also has a reduced diameter shank 76 creating a shoulder 75a spaced from the end of the tail 30 a distance about equal to one third the length of the sleeve 22. The exact location of the shoulder 75a is selected such that when the fastener 20 is used with thicker workpieces 26, any gap between the sleeve portion 75 and workpieces 26, will be closed by the bulbing action of the tail 30. Any gap in the area of the reduced diameter portion 76 will be closed by the radial expansion of the sleeve 22, as caused by interference between the shoulder 75a and the stem 24, as will be described in more detail below. The shank reduced diameter portion 76 extends from the shoulder 75a to a second reduced diameter portion 77 which is mainly in the sleeve head 28.

The reduced diameter head 77 creates a shoulder 76a spaced from the top of the manufactured head 28 a distance equal to about one third the length of the sleeve 22. The exact location of the shoulder 76a is selected such that interference between the shoulder 76a and the stem 24, will result in material being displaced into the reservoir 72 to lock the stem 24 and the sleeve 22 together, as will be described in more detail below. The reduced diameter head portion 77 extends from the shoulder 76a to a larger diameter annular recess 23 located at the outer end of the head 28.

The generally cylindrical stem 24 has a tail 32 on one end which is serrated to allow gripping by a pulling tool (not shown). Extending away from the tail 32 of the stem 24 is a non-serrated midsection 34. At the end of the stem 24 opposite the tail 32 is an elongated neck 38 and a head 40. The forward non-tapered part of the neck 38 has an outer diameter which is sized to fit into the sleeve portion 75 with little, if any, clearance. The stem has a reduced diameter portion which forms an annular reservoir 71 and creates an annular shoulder 71a. The diameter of the stem at the reservoir is slightly less than, the diameter of the sleeve reduced diameter shank portion 76.

Immediately adjacent the reservoir 71 is an annular locking groove 72 having an inner diameter smaller than that of the reservoir. The forward face of the reduced diameter stem portion forming the reservoir 71 creates a lock ring forming shoulder 72a that blends into the rear wall of the lock groove 72. The diameter of the stem 24 at the lock groove 72 is smaller than the remainder of the stem midsection 34 except for that of a break groove 44 which is spaced forwardly from the lock groove. The inner diameter of the stem 24 at the groove 44 is selected so that the stem 24 will separate at a predetermined pulling or tensile force at this location.

In operation, the fastener 20 is inserted into aligned holes in workpieces 26. The fastener 20 is inserted with the tail 30 of the sleeve 22 and the head 40 of the stem 24 protruding through to the blind side of the workpieces 26. The head 28 of the sleeve 22 is pressed against the accessible side of the workpieces 26, with the tail 32 of the stem 24 protruding from the sleeve 22 away from the workpieces 26.

Figure 7A:
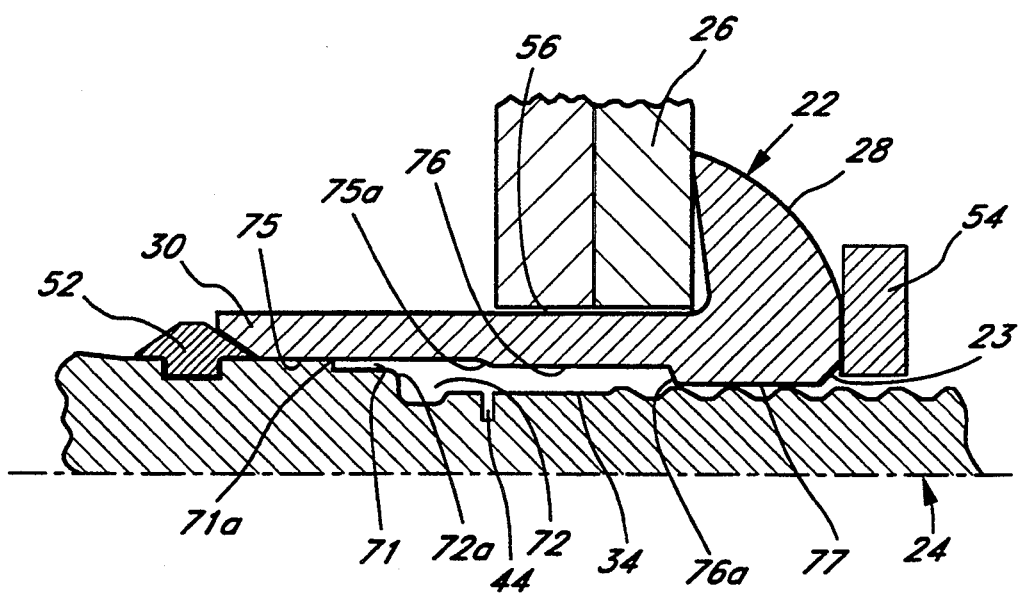

A pulling tool (not shown) grips the serrated tail end 32 of the stem 24, and an anvil portion 54 of the tool is pressed against the head 28 of the sleeve 22, as illustrated. As seen in FIGS. 7 and 7a, the shear ring 52 is engaging the tail 30 of the sleeve 22. The neck 38 of the stem 24 is located in the larger diameter sleeve portion 75.

When the fastener 20 is first inserted into the workpieces 26, it is very likely that there will be a clearance or gap 56 between the sleeve 22 and the workpieces 26 as shown in exaggerated form in FIG. 7a.

FIGS. 8 and 8a illustrate the fastener 20 after the pulling tool has begun to pull the stem 24 through the sleeve 22. At this stage, the stem 24 is at a position where the shoulder 71a has engaged the sleeve shoulder 75a and has partially deformed the sleeve shank section 76. As illustrated, when this occurs, the interference between the neck 38 and the sleeve 22 causes: 1) the sleeve 22 to be enlarged outwardly so as to fill the gap 56 between the sleeve 22 and the workpieces 26; and 2) any excess sleeve shoulder material 76b to be deposited or extruded into the reservoir 71.

As can be seen in FIG. 8, at this time, the tail 30 of the sleeve 22 has slid over the shear ring 52, causing the tail 30 to bulb outwardly. As shown in the top half of FIG. 8, with thin workpieces 26 the force on the shear ring has not yet exceeded the force necessary to shear the bulbing portion 53a from the anchor portion 53b of the shear ring 52. On the other hand, as illustrated in the bottom half of FIG. 8, on thicker workpieces 26, the bulbed tail 30 is tightly engaged with the workpieces 26 such that the force on the shearing ring 52 is greater and causes the bulbing portion 53a to be sheared from the anchor portion 53b of the shear ring 52.

At this stage, the gap 56 between the sleeve 22 and the workpieces 26 has been slightly closed in the area where the bulbed tail 30 has been pulled against the workpiece. It can be seen that the bulbing action of the tail 30 serves some function in closing the gap 56. However, it is apparent that this bulbing action alone is insufficient to accomplish the task of substantially filling the gap along the entire thickness of the workpieces 26. Therefore, it is necessary that the reduced diameter shank portion 76 on the sleeve 22 extend a sufficient distance along the length of the sleeve 22 such that when the fastener 20 is used with the maximum thickness workpieces 26, the hole filling function is accomplished. This function is further detailed below in conjunction with FIGS. 9 and 9a.

Figure 9:
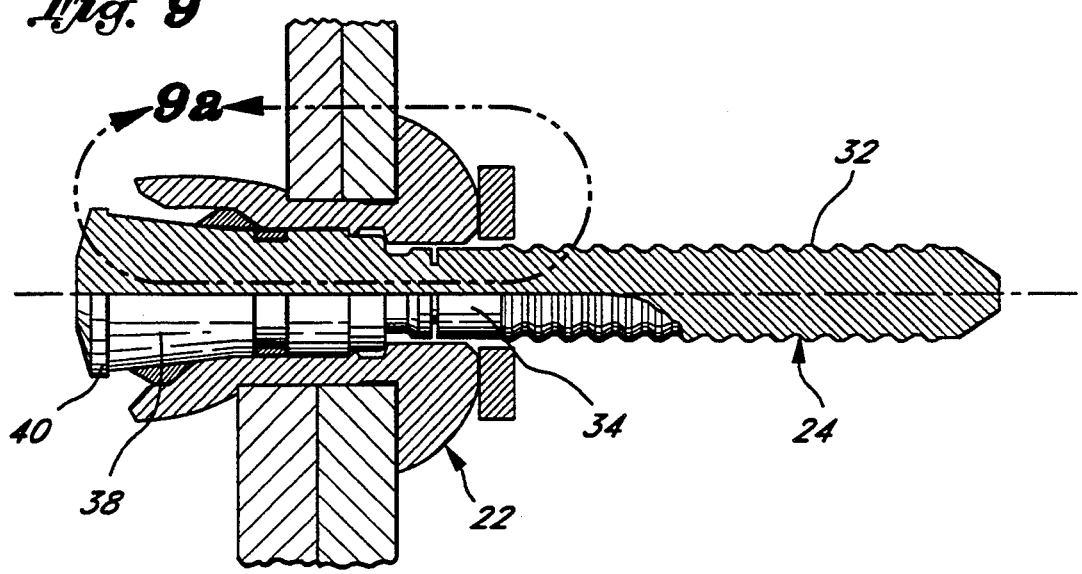
FIG. 9 is a cross-sectional side view of the fastener of FIG. 7 when the stem is partially installed and interference between the stem and sleeve has caused the sleeve to radially expand.
Figure 9A:
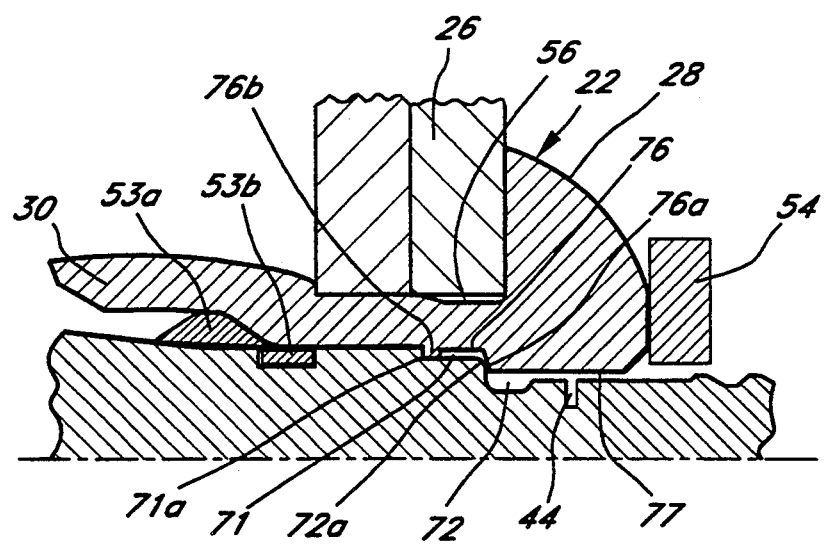

FIGS. 9 and 9a illustrate the fastener 20 when the lock ring forming shoulder 72a has just encountered the sleeve shoulder 76a. At this point, the bulbing portion 53a of the shear ring 52 has been sheared from the anchor portion 53b. Further, at this stage, the continuing interference between the neck 38 and the sleeve 22 has resulted in the sleeve being pressed outwardly so as to substantially fill the gap 56 between the sleeve 22 and the workpieces 26, with any excess sleeve shoulder material 76b having been deposited into the reservoir 71.

Figure 10:
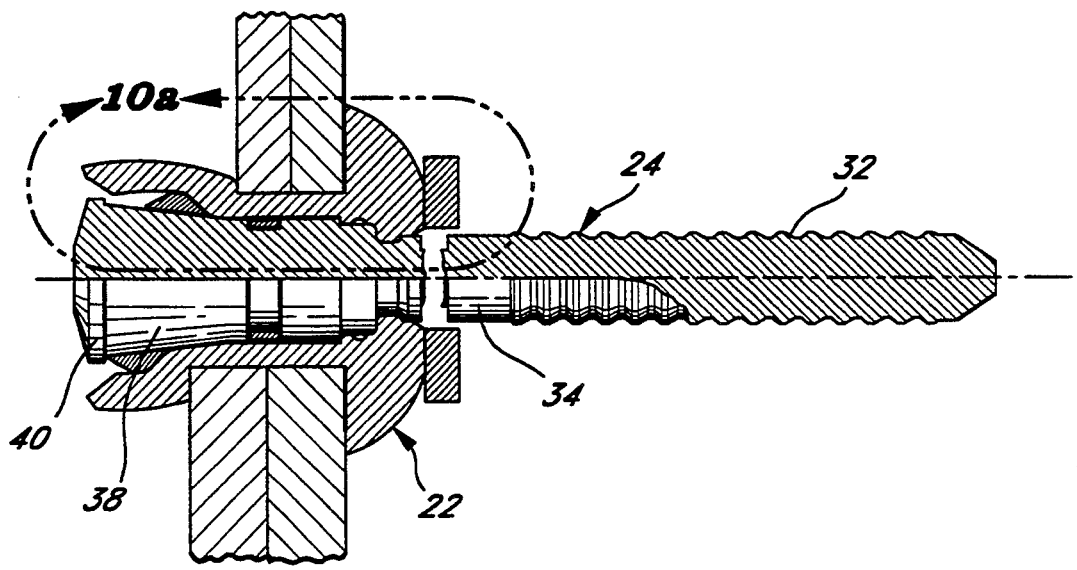
FIG. 10 is a cross-sectional side view of the fastener of FIG. 7 when fully installed.
Figure 10A:
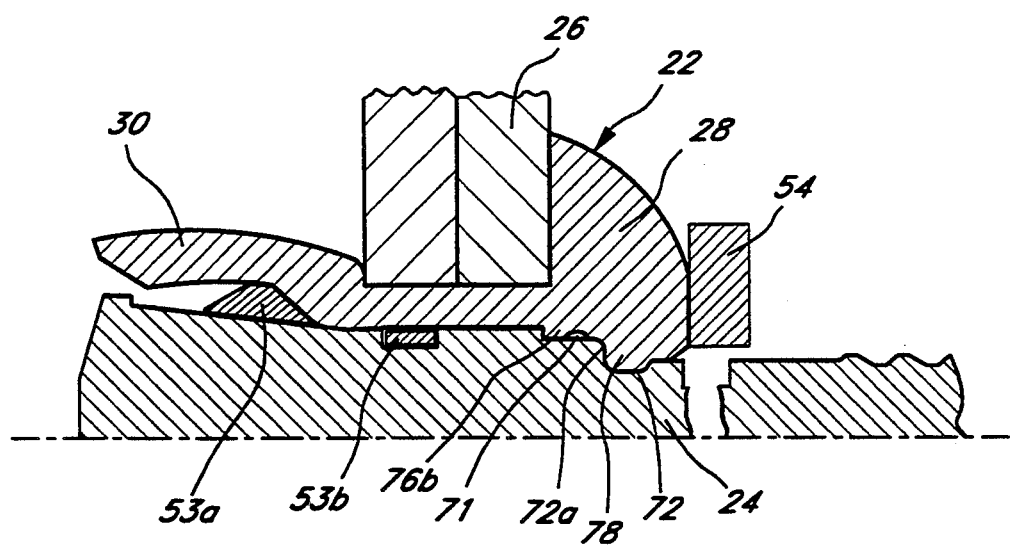

As the stem continues to be pulled, the interference between the lock ring forming shoulder 72a and the sleeve shoulder 76a causes the sleeve head portion 77 to be deformed so that material is deposited or extruded into and fills the lock groove 72, creating a lock ring 78 as shown in FIGS. 10 and 10a. Further, the stem shoulder 71 has moved further through the reduced diameter shank portion 76 of the sleeve 22, closing the gap 56 which had existed between the sleeve 22 and the workpieces 26. As this occurred, the shoulder 71a continued to extrude excess material from the reduced diameter shank portion 76 of the sleeve 22 into the reservoir 71. Lastly, as the pulling force on the stem 24 is increased under the resistance of the deformation of the lock ring 78 filling of the lock groove 72, the stem 24 is separated at the break notch 44 located in the midsection 34 of the stem 24.

Preferably, sleeve head material does not significantly move rearwardly into any remaining space in the end of the reservoir in that such would affect the flushness of the stem break with the exterior of the sleeve head. The exact condition would hinge on the material characteristics of the components and on the radial dimensions of the reservoir. Also the affect on flushness of the stem break would depend on the volume of the reservoir, which in turn is affected by the tolerances involved.

As illustrated in FIG. 10, when the fastener 20 is fully installed, the sheared portion 53a of the shear ring 52 and the stem head prevents the stem 24 from being pulled through the sleeve 22 towards the accessible side of the workpieces 26. At the same time, the deformed sleeve portion 77 filling the lock ring groove 72 prevents the seem 24 from being pulled downward or otherwise falling out from the sleeve 22 through the blind side of the workpieces 26. Also, gap 56 between the sleeve 22 and the workpieces 26 has been filled. The entire fastener 20 is clamping the workpieces 26 together between the head 28 of the sleeve 22 on the accessible side of the workpieces 26, and by the bulbed tail 30 on the blind side.

The filling of the reservoir 71 caused by tolerance differences between the stem 24 and sleeve 22 provides a secondary or supplemental stem lock. This lock, while useful in aiding the primary lock provided by the deformation of the sleeve portion 77, is not mandatory, however. Therefore, in the event that no material is sheared from the reduced diameter portion 76 of the sleeve 22, primary locking still occurs and is adequate.

Most importantly, the hole filling function provided by the interference between the neck 38 of the stem 24 and the reduced diameter portion 76 of the sleeve 24 is facilitated by the presence of the reservoir 71. Three scenarios of variations in workpiece/sleeve hole size 56 will help illustrate the importance of the reservoir 71.

A. The largest clearance scenario is presented when the sleeve 22 is much smaller than the opening in the workpiece 26 through which the fastener 20 is inserted. In other words, the maximum sized gap 56 is created between the sleeve 22 and the workpiece 26. Therefore, the interference between the neck 38 of the stem 24 and the reduced diameter portion 76 of the sleeve 22 must be such that the gap 56 between the sleeve 22 and the workpieces 26 is still filled. This interference is created by sizing the neck 38 and reduced diameter portion 76 of the sleeve 22 accordingly. In this scenario there should be little, if any, extruding of material from the reduced diameter portion 76, as all of the sleeve material is necessarily used to fill the gap 56.

B. The smallest clearance scenario is presented when the sleeve 22 fits snugly within the workpieces 26, such that there is little, if any, gap 56 between the sleeve 22 and workpiece to fill. In this scenario, the majority of the shoulder material will be extruded or sheared by the neck 38, as the sleeve 22 has no room to expand. Thus, the maximum amount of material 76b will move into the reservoir 71. Therefore, the reservoir 71 must be sized to accommodate this scenario.

C. An intermediate clearance scenario is presented at all ranges between the above two extremes, where an amount of material between the maximum and no material at all is moved from the reduced diameter portion 76 into the reservoir 71. These situations pose no problem once the reservoir 71, reduced diameter portion 76, and neck 38 sizes have been chosen to accommodate the above two situations.

Although this invention has been described in terms of certain preferred embodiments, other embodiments that are apparent to those of ordinary skill in the art are also within the scope of this invention. For example, the stem and sleeve can be configured so that the sleeve does not have a reduced diameter shoulder and the defining shoulder of the stem neck interferes with the internal diameter of the sleeve tail.

What is claimed is:

1. A fastener for securing workpieces having aligned openings therein, comprising:

a tubular sleeve;

an elongated stem extending through said sleeve, said stem having a hole filling shoulder which will interfere with said sleeve to radially enlarge the sleeve so that clearance between the sleeve and the workpiece is eliminated when the fastener is installed in said opening, and said shoulder being capable of removing excess material from the interior of the sleeve as the stem is pulled with respect to said sleeve;

said stem including an annular reservoir open to said shoulder for receiving said excess sleeve material not used to fill said clearance when said fastener is installed; and said stem including an annular lock ring groove for receiving a lock ring to axially lock the stem and sleeve together, said reservoir being positioned between said shoulder and said lock ring groove, the volume of said reservoir being sufficiently large to accommodate all of said excess material in the maximum interference condition between said stem shoulder and said sleeve;

said reservoir having a forward edge which is radially aligned with a rear wall of said lock ring groove, with said wall forming a lock ring shoulder.

2. The fastener of claim 1, wherein the volume of said reservoir is less than the volume of said lock ring groove.

3. The fastener of claim 1, wherein the smallest diameter of said reservoir is more than that of said lock ring groove.

4. The fastener of claim 1, wherein said sleeve has a head for engaging one of said workpieces and a shank portion adjacent the head which extends through said workpieces, said shank portion having an interior diameter which is larger than the outer diameter of said lock ring shoulder.

5. The fastener of claim 4, wherein said sleeve has an interior shoulder at the intersection of the head end of said sleeve shank portion and a reduced diameter in said sleeve, said sleeve shoulder and said stem lock ring shoulder being sized to engage and extrude sleeve material into said lock ring groove when said stem is drawn into said sleeve.

6. The fastener of claim 4, wherein said head has an interior diameter which is smaller than the outer diameter of said lock ring shoulder.

7. A fastener for securing workpieces having aligned openings therein, comprising:

a tubular sleeve;

an elongated stem extending through said sleeve, said stem having a hole filling shoulder which will interfere with said sleeve to radially enlarge the sleeve so that clearance between the sleeve and the workpiece is eliminated when the fastener is installed in said opening, and said shoulder being capable of removing excess material from the interior of the sleeve as the stem is pulled with respect to said sleeve;

said stem including an annular reservoir open to said shoulder for receiving said excess sleeve material not used to fill said clearance when said fastener is installed;

said stem including an annular lock ring groove; and a lock ring surrounding said stem and adapted to fit in said groove to lock the stem to the sleeve;

said reservoir being positioned between said shoulder and said lock ring groove, the volume of said reservoir being sufficiently large to accommodate all of said excess material in the maximum interference condition between said stem shoulder and said sleeve.

8. A fastener for securing workpiece having aligned openings therein, comprising:

a tubular sleeve having a head on one end and an adjacent shank portion for extending through said workpieces when said head engages one side of said workpieces; and an elongated stem extending through said sleeve and including a shoulder which will interfere with said sleeve shank portion to radially enlarge the sleeve so that any clearance between said sleeve and said workpieces is eliminated as said fastener is drawn into said sleeve and which is capable of removing excess material from the interior of said sleeve, said stem including a shallow reservoir groove adjacent said shoulder to receive said excess material;

said sleeve having an interior shoulder near the intersection of the head end of said sleeve shank portion and a reduced diameter in said sleeve head;

said stem including a reduced diameter portion which slides within said sleeve reduced diameter portion, and said stem including a lock ring groove between the rear of said reduced diameter portion and said reservoir groove, the boundary between said reservoir groove and said lock ring groove creating a lock ring forming shoulder on said stem, said stem and sleeve materials being selected such that said lock ring forming shoulder will engage said sleeve shoulder and extrude material from said sleeve shoulder into said lock ring groove to create a lock ring as said stem is drawn into said sleeve;

said stem including a break groove forward from said reservoir groove enabling a pulling end of said stem to be broken away from the portion of the stem within the sleeve after said lock ring groove is filled, and said fastener being constructed so that said stem pulling end is broken away before sleeve head material can be extruded into said reservoir.

9. A method of securing workpieces having aligned openings therein with a fastener comprised of (1) a tubular sleeve having a head on one end, an adjacent shank portion having an interior shoulder formed at the intersection of the head end of said sleeve shank portion and a reduced diameter portion in said sleeve, and (2) an elongated stem extending through said sleeve, the stem including a shallow reservoir groove, the boundary between a rear edge of said reservoir groove and said stem creating a workpiece hole filling shoulder on said stem, and an adjacent lock ring groove, the boundary between said reservoir groove and said lock ring groove creating a lock ring forming shoulder on said stem, comprising the steps of:

extending said fastener through said workpieces until said head engages one side of said workpieces;

drawing said stem into said sleeve to cause said stem hole filling shoulder to interfere with the interior of said sleeve shank portion to radially enlarge the sleeve to fill any clearance between said sleeve and said workpieces;

displacing from the interior of said sleeve shank portion excess material not required to fill clearance between said sleeve and said workpieces into said shallow reservoir groove; and drawing said stem further into said sleeve to cause said lock ring forming shoulder to interfere with said sleeve shoulder to displace material from said sleeve shoulder into said lock ring groove forming a lock ring to lock the stem and the sleeve together.

10. The method of claim 9, including pulling on said stem to break a pulling end of said stem away from the portion of said stem in said sleeve after said lock ring groove is filled with extruded sleeve head material but before sleeve head material can extrude into said reservoir.

* * * * *